Sept. 22, 1959   G. J. SAHULA   2,905,019
STEERING WHEEL
Filed Aug. 30, 1956   2 Sheets-Sheet 1

INVENTOR.
George J. Sahula.
BY
Harness, Dickey & Pierce
ATTORNEYS.

Sept. 22, 1959 G. J. SAHULA 2,905,019
STEERING WHEEL

Filed Aug. 30, 1956 2 Sheets-Sheet 2

INVENTOR.
George J. Sahula
BY
Harness, Dickey & Pierce
ATTORNEYS

# United States Patent Office 2,905,019
Patented Sept. 22, 1959

2,905,019
STEERING WHEEL

George J. Sahula, Union City, Ind., assignor to Sheller Manufacturing Corporation, Portland, Ind., a corporation of Indiana Application August 30, 1956, Serial No. 607,147

3 Claims. (Cl. 74—493)

This invention relates generally to steering wheels and more particularly to a vehicle steering wheel which may be moved into a tilted position to provide added clearance for the vehicle driver in entering and leaving the vehicle.

An object of this invention is to provide an improved vehicle steering wheel.

A further object of this invention is to provide a steering wheel which is releasably locked in an operative position and which is readily unlocked for movement to a plurality of tilted non-operative positions.

Another object of this invention is to provide a steering wheel which is tiltable in response to pressure applied to any peripheral portion of the wheel.

Still another object of this invention is to provide a steering wheel which is simple in construction, economical to manufacture and which is readily moved from a locked operative position to tilted non-operative positions and vice versa.

Further objects, features and advantages of this invention will become apparent from a consideration of the following description when taken in connection with the accompanying drawing in which.

Figure 1:
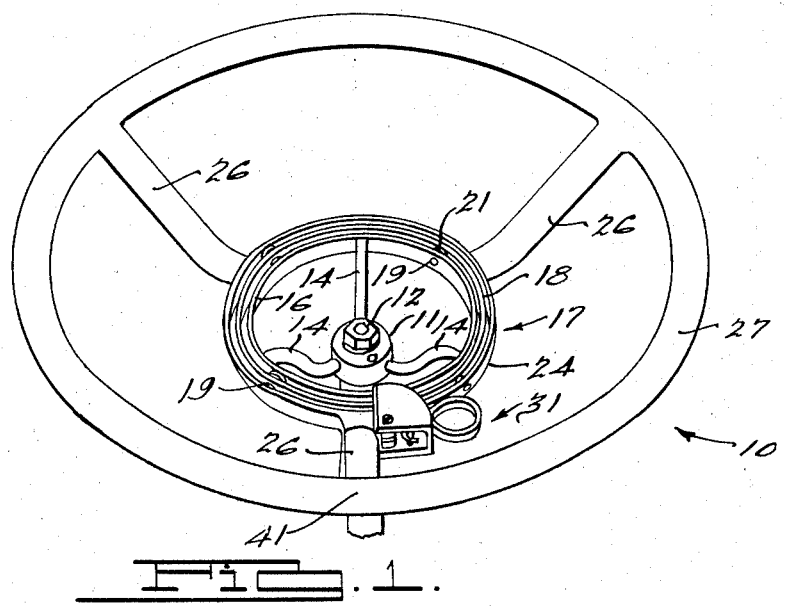
Figure 1 is a perspective view of the steering wheel of this invention, showing the steering wheel in a locked operative position.

With reference to the drawing, the steering wheel of this invention, indicated generally at 10, is illustrated as including an annular hub 11, secured by a nut 12 to a steering column, only an upper end portion 13 of which is shown. A three ring gimbal mounting unit, indicated generally at 17, connects the hub 11 with an outer annular rim 27 for the steering wheel 10. The unit 17 includes an inner ring 16 arranged in a concentric relation with and rigidly secured to the hub 11 by means of three brace members 14. An intermediate ring 18 for the unit 17 is pivotally connected at diametrically opposite portions thereof to the inner ring 16 by means of a pair of pivots or pins 19, which carry spacers or washers 21 positioned between the rings 16 and 18.

A similar pair of pivots 22 arranged midway between the pivots 19, pivotally connect diametrically opposite portions of the intermediate ring 18 to similar portions of an outer ring 24 for the unit 17. Washers 23, on the pivots 22, are positioned between the rings 18 and 24 for maintaining the rings in a spaced relation. The outer ring 24 is in turn rigidly connected by three arms 26 to the annular rim 27 for the steering wheel 10.

Figure 2:
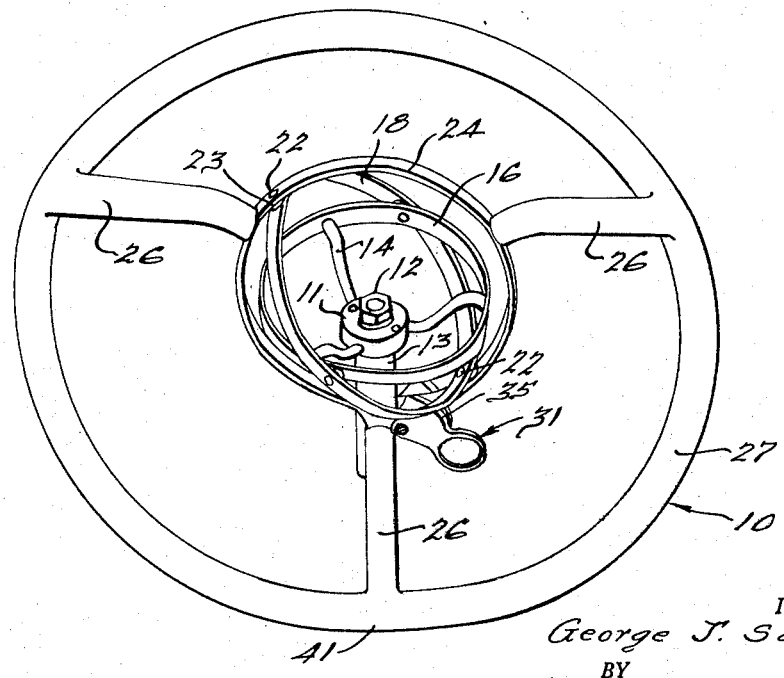
Figure 2 is a perspective view showing the steering wheel of this invention in one tilted non-operative position.
Figure 5:
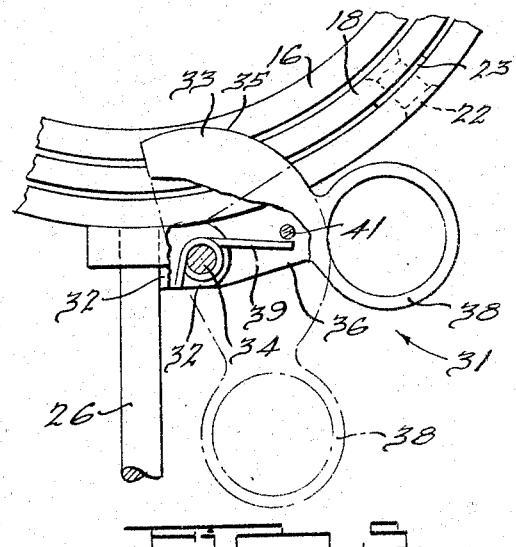
Figure 5 is a fragmentary top plan view of a portion of the steering wheel of this invention, with some parts broken away for the purpose of clarity.
Figure 4:
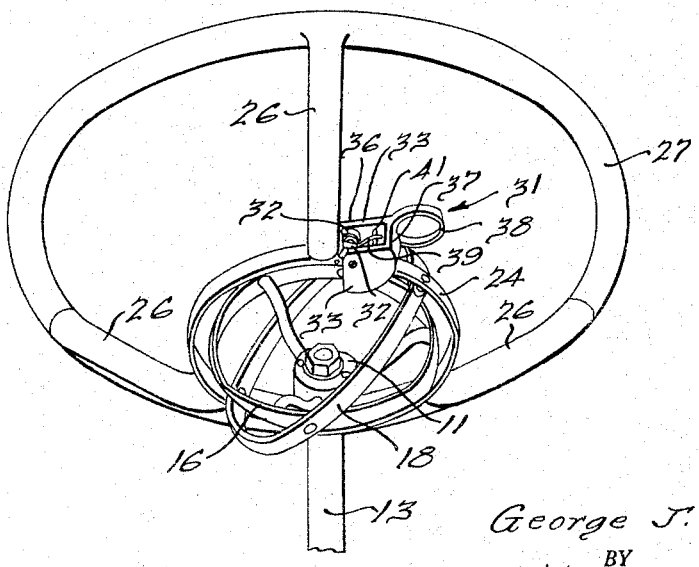
Figure 4 is a perspective view showing the steering wheel of this invention in another tilted position.

In normal use of the steering wheel 10 to steer a vehicle, the rings 16, 18 and 24 for the gimbal unit 17 are maintained in the concentric relation illustrated in Figure 1 by a releasable locking unit, indicated generally at 31 (Figures 2, 4 and 5). The unit 31 is movably mounted on a pair of ears 32 on one of the arms 26 adjacent the juncture thereof with the outer ring 24.

As best appears in Figure 5, the locking unit 31 includes a pair of spaced parallel locking plates 33, of a generally segment shape, pivotally supported on a pin 34 carried by the ears 32. Adjacent their outer sides 36 (Figures 4 and 5), the locking plates 33 are connected by a brace 37 extended therebetween and integrally formed with a finger actuating loop 38. A torsion spring 39 carried on the pin 34 engages a second pin 41 carried by the locking plates 33 adjacent the brace 37 for normally urging the locking plates 33 toward the locking position shown in full lines in Figure 5. In this position the plates 33 extend over and are positioned on opposite sides of the rings 16, 18 and 24 to maintain the rings in the concentric positions illustrated in Figure 1.

Figure 3:
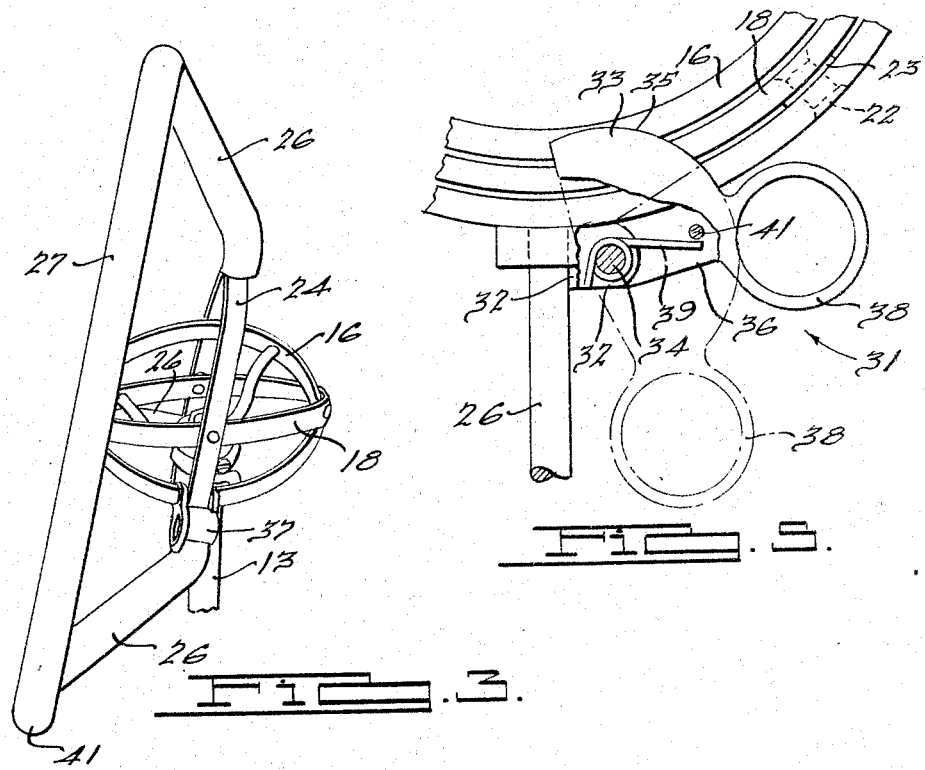
Figure 3 is a perspective view looking at one side of the steering wheel of this invention in the tilted position illustrated in Figure 2, and with the wheel in a rotated position relative to that shown in Figure 2.

By manually manipulating the finger loop 38, the locking plates 33 are swingable in a clockwise direction as viewed in Figure 5 to the dotted line release position shown therein in which the plates 33 are in a clearance relation with the inner ring 16 and the intermediate ring 18. In this position of the locking unit 31, therefore, the rings 16, 18 and 24 are movable relative to each other. When the outer ring 24 has been moved out of a concentric relation with the ring 18, the finger grip 38 is released for movement of the unit 31 to a stop position in which either the brace 37 engages the ring 24 (Figure 4), the plates 33 engage the intermediate ring 18 (Figure 2), or the plates 33 engage the inner ring 16 (Figure 3). The unit 31 thus does not interfere with manipulation of the gimbal unit 17 during tilting of the steering wheel 10.

As best appears in Figure 5 the inner sides 35 of the plates 33 are of a curved cam shape. During movement of the steering wheel 10 to its locked operative position shown in Figure 1, contact of the intermediate ring 18 and the inner ring 16 with the plates 33 is at the cam shape sides 35 thereof. As a result the rings 16 and 18 move along the cam sides 35 to progressively move the plates 33 outwardly about the pivot 34 and the spring 39 provides for automatic movement of the unit 31 to a locking position without any manual attention.

In the event movement of the steering wheel 10 to a non-operative tilted position is desired, in order to provide added clearance for the vehicle driver in either entering or leaving the vehicle, the locking unit 31 is first moved, against the action of the spring 39, to release position illustrated in dotted lines in Figure 5. Any peripheral portion of the rim 27 is then manually moved either toward or away from the steering column 13 to tilt the steering wheel 10. For example, when the portion of the rim indicated at 41 is moved downwardly toward the steering column 13, the steering wheel 10 is moved to the tilted position illustrated in Figures 2 and 3. To achieve this movement, the intermediate ring 18 pivots about the pins 19 toward a plane perpendicular to the plane of the stationary inner ring 16. Concurrently with this pivotal movement of the intermediate ring 18, the outer ring 24, which is maintained in a concentric relation with the rim 27 by the arms 26, pivots about the pins 22 toward a plane which is perpendicular to both the plane of the inner ring 16 and the plane toward which the intermediate ring 18 is moving. As best appears in Figure 3, the steering wheel 10 is tiltable to a stopped position in which the outer ring 24 engages the steering column 13.

In Figure 4, a tilted position of the steering wheel 10 is illustrated which is achieved in response to movement of the rim portion 41 in a direction away from the steering column 13. As shown therein, the intermediate ring 18 and the outer ring 24 are again moved toward their limiting planes described in connection with Figures 2 and 3, with this movement being in direction opposite to the direction of movement of the rings in response to movement of the rim portion 41 toward the column 13. The steering wheel 10 is similarly moveable to other tilted positions in response to pressure applied to other portions of the rim 27 when the locking unit 31 is moved to its released position and manually held in that position until the rings are moved out of their concentric positions illustrated in Figure 1.

From the above description, it is seen that this invention provides a steering wheel 10 which is readily movable to a plurality of tilted positions to provide driver clearance in entering or leaving the vehicle and which is quickly locked in a fixed position relative to the steering column during the operation of the vehicle. The gimbal supporting unit 17 provides for a firm support of the rim 27 on the hub 11, with this support being movable when desired and locked in a stationary position also when desired. In addition, the supporting unit 17 provides this firm support without danger of undue stresses on either the rings 16, 18 and 24 or the pivots 19 and 22.

Although the invention has been described with respect to a preferred embodiment thereof, it is to be understood that it is not to be so limited, since changes can be made therein which are within the scope of the appended claims.

What is claimed is:

1. A tiltable steering wheel comprising a hub, a rim, three ring members arranged in a concentric relation and movable to telescoped positions, means fixing the inner one of said ring members on said hub, means fixing the outer one of said ring members to said rim, pivot means connecting the intermediate one of said ring members to said inner ring member for rotation toward a plane perpendicular to the plane of said inner ring member and means pivotally connecting said outer ring member to the intermediate ring member for pivotal movement of said outer ring member toward a plane perpendicular to both of the aforementioned planes, so that said rim is tiltable in a plurality of directions relative to said hub.

2. A tiltable steering wheel comprising a hub, a rim extended about said hub, an inner ring member secured to said hub, an intermediate ring member extended about said inner ring member and pivotally connected to diametrically opposite portions thereof, an outer ring member extended about said intermediate ring member and pivotally connected to diametrically opposite portions thereof at positions substantially midway between the pivot connections of said intermediate ring member to said inner ring member, means securing said rim to said outer ring member and means operatively associated with said ring members for releasably locking said ring members in relatively telescoped positions.

3. A steering wheel comprising a hub, a rim, and a ring assembly connected to and extended between said hub and said rim, said ring assembly including three ring members pivotally connected together for movement between telescoped concentric positions and relatively tilted positions, and means including a pair of parallel spaced locking plates biased toward positions on opposite sides of said ring members in the concentric positions thereof for locking said ring members in said positions, said plates having cam shape sides engageable with some of said ring members on movement of said ring members toward said concentric positions for moving said plates out of the path of movement of said ring members.

References Cited in the file of this patent

UNITED STATES PATENTS

| | | |
|---|---|---|
| 748,252 | Anderson | Dec. 29, 1903 |
| 2,518,175 | Pinardi | Aug. 8, 1950 |
| 2,770,981 | Fieber | Nov. 20, 1956 |
| 2,845,810 | Sampson | Aug. 5, 1958 |